United States Patent [19]

Dison

[11] 3,889,780
[45] June 17, 1975

[54] GREASE RETAINER FOR ENGAGED SPLINES
[75] Inventor: James R. Dison, Indianapolis, Ind.
[73] Assignee: General Motors Corporation, Detroit, Mich.
[22] Filed: Sept. 9, 1974
[21] Appl. No.: 504,031

[52] U.S. Cl................... 184/1 R; 74/606; 277/178
[51] Int. Cl............................................ F01m 9/00
[58] Field of Search ............... 277/178, 29; 74/606; 184/1 R, 6.11

[56] References Cited
UNITED STATES PATENTS
3,240,502 3/1966 Snyder........................ 277/178 X
3,289,953 12/1966 Johnson et al................. 184/1 R X
3,424,857 1/1969 Miller et al.................... 277/178 X
3,467,395 9/1969 Yoshiro Kan.................. 277/178 X Primary Examiner—Richard C. Pinkham
Assistant Examiner—William R. Browne
Attorney, Agent, or Firm—Paul Fitzpatrick

[57] ABSTRACT

A hollow accessory drive shaft for an aircraft gas turbine engine has internal splines which mate with external splines on shafts extending from the drive shaft into engine accessory devices. Grease packed into the splines is blocked from migrating to the central portion of the drive shaft away from the splines by elastomeric plugs retained in the shaft by circumferential tongue and groove connections.

4 Claims, 3 Drawing Figures

PATENTED JUN 17 1975 3,889,780

GREASE RETAINER FOR ENGAGED SPLINES

The invention described herein was made in the course of work under a contract with the Department of Defense.

My invention relates to an improved arrangement for retaining grease with which splines in such a drive are packed against migration away from the splines, which would leave the splines relatively dry and subject to undesired wear. In its preferred embodiment, the invention comprises an elastomeric plug which may be readily slipped into place in a hollow shaft and lodged on a circumferential ridge in the shaft adjacent to the mating splines so as to provide a barrier to movement of the grease away from the splines.

The principal objects of my invention are to improve the lubrication of grease-packed splines and the like and to minimize wear in aircraft accessory drive shaft arrangements.

The nature of my invention and its advantages will be clear to those skilled in the art from the succeeding detailed description of preferred embodiments of the invention, the accompanying drawings thereof, and the appended claims:

Figure 1:
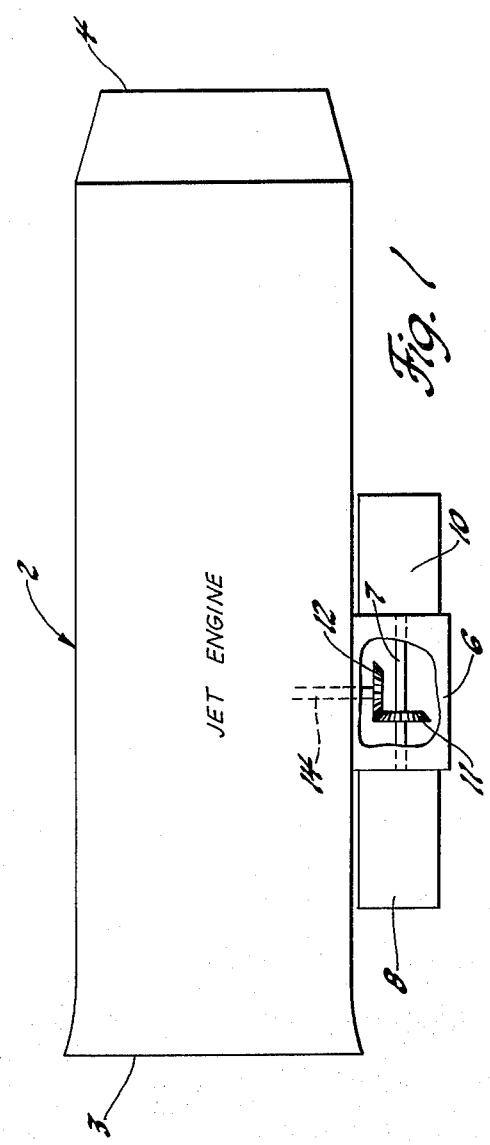
FIG. 1 is a schematic illustration of an aircraft turbofan engine with an accessory drive arrangement on the engine.

Referring first to FIG. 1, the jet engine 2 illustrated schematically may be of any known type of structure; specifically, in the preferred embodiment of the invention, it is the well known TF41 turbofan engine. The engine has a forward air intake end 3 and an aft jet exhaust nozzle 4. An accessory drive gear box 6 is suitably suspended below the engine. It provides for coupling various engine and aircraft accessories to the engine, as is well known. Specifically, the accessory drive gear box 6 includes a main fore and aft shaft 7 rotatably mounted, by means to be described, in the gear box 6. Shaft 7 is connected to a constant speed drive and alternator assembly 8 and to a starter 10. Shaft 7 bears a bevel gear 11 which meshes with a bevel gear 12 on a radial shaft 14 suitably connected, by means not illustrated, to the high pressure rotor of the turbofan engine. The accessory gear box also mounts other accessories such as oil pumps, fuel pumps, and fuel controls which need not be described.

Figure 2:
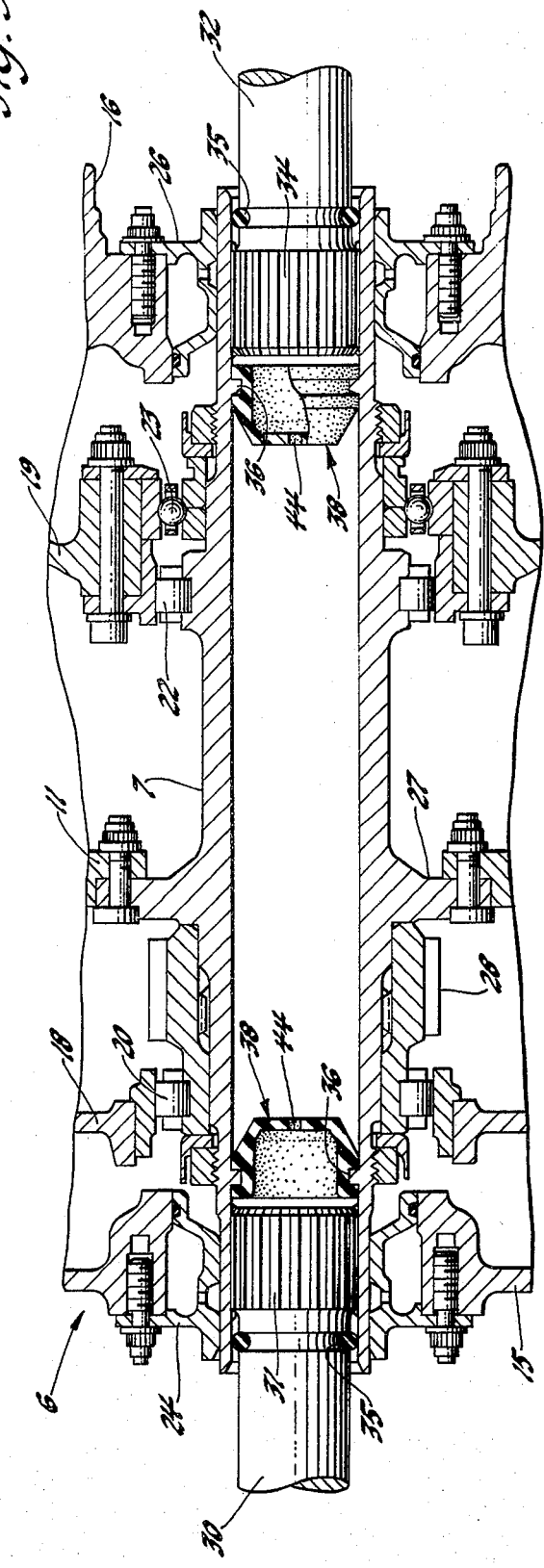
FIG. 2 is a partial view of the accessory drive arrangement taken in a plane containing the axis of a drive shaft.

Referring to FIG. 2, the gear box 6 includes a forward wall 15, a rear wall 16, and internal generally vertical shaft supporting webs 18 and 19. The shaft 7 is a hollow shaft mounted for rotation in a roller bearing 20 in web 18 and in a roller bearing 22 and a ball thrust bearing 23 in web 19. The ends of the shaft extend a short distance through openings in the walls 15 and 16 where they are sealed by hollow seal rings 24 and 26 to which air is supplied under pressure and from which it is discharged onto the outer surface of the shaft to prevent leakage of oil from the gear box. The shaft 7 includes an integral flange 27 to which the bevel gear 11 is bolted. A spur gear 28 splined to the shaft 7 provides for drive of other shafts parallel to shaft 7 which are connected to other accessory devices. A further description of structure external to shaft 7 will be omitted, since the details are immaterial to the present invention.

Shaft 7 is coupled to a constant speed drive input shaft 30 by external splines 31 on shaft 30 and mating internal splines at the forward end of shaft 7. It is similarly coupled to a starter shaft 32 by external splines 34 on the starter shaft and mating internal splines on shaft 7. Shafts 30 and 32 are solid. An O-ring 35 mounted in a circumferential groove on each shaft external to the splines serves to prevent leakage of lubricant from the splines through the outer ends of shaft 7.

The engine 2 is supplied with the gear box 6 but without the accessories 8 and 10, which are added later. As these are bolted into place on the accessory gear box, the shafts 30 and 32 are pushed into position so that the sets of splines properly mate. The splines are packed with a suitable grease at this time. Experience has shown that the grease tends to creep or migrate toward the middle of the hollow shaft 7, leaving the splines relatively dry and thus accelerating wear of the splines.

Figure 3:
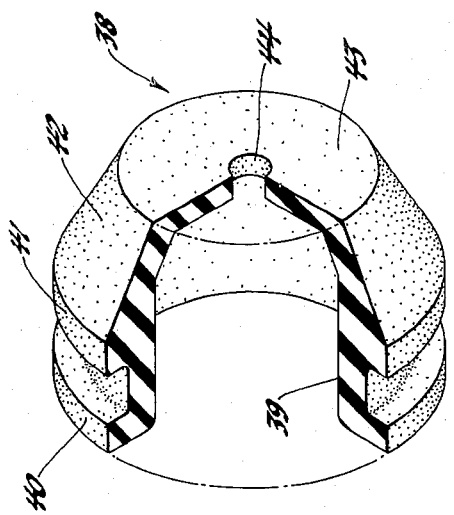
FIG. 3 is an axonometric view of an elastomeric grease retaining plug.

To solve this problem, I have devised the system of plugs to be described. Each end of the shaft includes an internal circumferential rib 36 which was initially provided to prevent over-insertion of the shaft 30 or 32, and also with the thought that it would act as a lubricant dam. I provide an effective dam by employing hollow elastomeric plugs 38 which, as will be seen most clearly from FIG. 3, have an outer wall 39 bearing two flanges or lips 40 and 41 and having a tapering nose 42 extending forwardly from the flange 41. The plug also includes a forward wall 43 at the end of nose 42 through which a small air vent hole 44 extends. The nose 42 tapers at an angle of approximately 30° to the axis of the plug.

The plug may be made of any suitable grease-resistant durable elastomeric material which is sufficiently elastic or flexible to permit it to be readily installed over the ribs 36. Specifically, the preferred material is a fluorocarbon rubber sold under the name "Viton B."

The plug 38 is put into place simply by pressing it into the shaft until the flange 41 passes the rib 36 and the plug is locked axially by a tongue and groove engagement between the rib 36 and the flanges on the plug. The small vent hole is provided to prevent air pressure generated by pushing the shaft 30 or 32 into place from dislodging the plug and blowing it toward the center of the shaft. Since the hole 44 is small, there is ample capacity for the grease, which in rotation is urged centrifugally toward the inner surface of the shaft and which has no noticeable tendency to flow through the centrally located vent 44.

It will be seen that my invention provides a simple, inexpensive, and adequate solution to the problem of escape of grease from the splines and is thus well adapted to insure greater endurance of the spline connections. It also provides a reservoir of suitable capacity for the grease. It can readily be applied to existing engines without modification of the engines.

The detailed description of the preferred embodiment of the invention for the purpose of explaining the principles thereof is not to be considered as limiting or restricting the invention, since many modifications may be made by the exercise of skill in the art.

I claim:

1. An accessory drive installation comprising a gear box, a hollow drive shaft mounted in the gear box for rotation about the shaft axis, an accessory device mounted on the gear box having a connecting shaft with external splines, the drive shaft having internal splines mating with the said external splines, and means for retaining grease packed in the splines comprising an elastomeric plug mounted in the shaft and having a circumferential tongue and groove locating connection with the shaft, the plug being yieldable for insertion of the plug.

2. An accessory drive installation comprising a gear box, a hollow drive shaft mounted in the gear box for rotation about the shaft axis, an accessory device mounted on the gear box having a connecting shaft with external splines, the drive shaft having internal splines mating with the said external splines, and means for retaining grease packed in the splines comprising an elastomeric plug mounted in the shaft and having a circumferential tongue and groove locating connection with the shaft, the plug being yieldable for insertion of the plug, the plug having a central vent opening substantially smaller in diameter than the plug.

3. An accessory drive installation comprising a gear box, a hollow drive shaft mounted in the gear box for rotation about the shaft axis, an accessory device mounted on the gear box having a connecting shaft with external splines, the drive shaft having internal splines mating with the said external splines, and means for retaining grease packed in the splines comprising an internal circumferential rib on the drive shaft adjacent to the splines and an elastomeric plug mounted in the shaft and having external flanges straddling the said rib to hold the plug in position.

4. An accessory drive installation comprising a gear box, a hollow drive shaft mounted in the gear box for rotation about the shaft axis, an accessory device mounted on the gear box having a connecting shaft with external splines, the drive shaft having internal splines mating with the said external splines, and means for retaining grease packed in the splines comprising an internal circumferential rib on the drive shaft adjacent to the splines and an elastomeric plug mounted in the shaft and having external flanges straddling the said rib to hold the plug in position, the plug having a central vent opening substantially smaller in diameter than the plug.

* * * * *